(12) United States Patent
Wagh et al.

(10) Patent No.: US 8,557,342 B2
(45) Date of Patent: Oct. 15, 2013

(54) INORGANIC PHOSPHATE CORROSION RESISTANT COATINGS

(75) Inventors: Arun Wagh, Naperville, IL (US); Vadym Drozd, Miami, FL (US)

(73) Assignee: Latitude 18, Inc., Marco Island, FL (US)

( * ) Notice: Subject to any disclaimer, the term of this patent is extended or adjusted under 35 U.S.C. 154(b) by 204 days.

(21) Appl. No.: 12/860,513

(22) Filed: Aug. 20, 2010

(65) Prior Publication Data

US 2011/0143154 A1    Jun. 16, 2011

Related U.S. Application Data

(60) Provisional application No. 61/288,192, filed on Dec. 18, 2009, provisional application No. 61/285,948, filed on Dec. 11, 2009.

(51) Int. Cl.
*B05C 13/00* (2006.01)
*B05D 3/00* (2006.01)

(52) U.S. Cl.
USPC .......................... 427/327; 427/331; 427/142

(58) Field of Classification Search
USPC .............................................. 427/327, 430.1
See application file for complete search history.

(56) References Cited

U.S. PATENT DOCUMENTS

| | | |
|---|---|---|
| 2,257,281 A | 9/1941 | Scholz |
| 2,329,065 A | 9/1943 | Lum et al. |
| 2,450,952 A | 10/1948 | Greger |
| 3,184,320 A | 5/1965 | Michael |
| 3,392,007 A | 7/1968 | Ivan et al. |
| 3,973,056 A | 8/1976 | Fessler et al. |
| 4,339,405 A | 7/1982 | Paszner |
| 4,395,456 A | 7/1983 | Jackson et al. |
| 4,478,805 A | 10/1984 | Langer et al. |
| 4,504,555 A | 3/1985 | Prior et al. |
| 4,683,151 A | 7/1987 | Hamaguchi et al. |
| 4,721,659 A | 1/1988 | Tieckelmann et al. |
| 4,756,762 A | 7/1988 | Weill et al. |
| 4,799,652 A | 1/1989 | Daussan et al. |
| 4,839,049 A | 6/1989 | Kinney et al. |

(Continued)

FOREIGN PATENT DOCUMENTS

| | | |
|---|---|---|
| EP | 0256908 | 2/1988 |
| EP | 0359002 | 3/1993 |

(Continued)

OTHER PUBLICATIONS

Korean Intellectual Property Office, PCT International Preliminary Report on Patentability and Written Opinion of the International Searching Authority for International Application No. PCT/US2010/046126 dated Jun. 12, 2012.

(Continued)

*Primary Examiner* — David Turocy
(74) *Attorney, Agent, or Firm* — Christopher J. Knors; Moore & Van Allen PLLC

(57) ABSTRACT

This disclosure relates to phosphate coatings that inhibit corrosion of metals, specifically coatings comprising acidic phosphate and alkaline metal oxide/hydroxide components. In one particular embodiment, phosphate-based coating formulations that reduce or eliminate corrosion of steel and other metals are disclosed. In other embodiments, methods for coating steel surfaces with acidic phosphate and alkaline metal oxide/hydroxide components to reduce or eliminate corrosion of the metal surfaces are disclosed.

3 Claims, 8 Drawing Sheets

(56) References Cited

U.S. PATENT DOCUMENTS

| | | |
|---|---|---|
| 5,002,610 A | 3/1991 | Sherif et al. |
| 5,039,454 A | 8/1991 | Policastro et al. |
| 5,135,576 A | 8/1992 | Johansen et al. |
| 5,173,960 A | 12/1992 | Dickinson |
| 5,182,049 A | 1/1993 | Von Bonin |
| 5,283,276 A | 2/1994 | Best et al. |
| 5,302,563 A | 4/1994 | Rumpeltin et al. |
| 5,338,356 A | 8/1994 | Hirano et al. |
| 5,401,538 A | 3/1995 | Perito |
| 5,494,708 A | 2/1996 | Chess |
| 5,597,120 A | 1/1997 | Chess |
| 5,624,493 A | 4/1997 | Wagh et al. |
| 5,645,518 A | 7/1997 | Wagh et al. |
| 5,718,757 A | 2/1998 | Guillou et al. |
| 5,830,815 A | 11/1998 | Wagh et al. |
| 5,846,894 A | 12/1998 | Singh et al. |
| 5,911,819 A | 6/1999 | Drs et al. |
| 5,954,867 A | 9/1999 | Chow et al. |
| 5,968,240 A | 10/1999 | Myers et al. |
| 6,103,007 A | 8/2000 | Wu et al. |
| 6,133,498 A | 10/2000 | Singh et al. |
| 6,136,088 A | 10/2000 | Farrington |
| 6,153,809 A | 11/2000 | Singh et al. |
| 6,204,214 B1 | 3/2001 | Singh et al. |
| 6,399,021 B1 | 6/2002 | Heimann et al. |
| 6,458,423 B1* | 10/2002 | Goodson ............... 427/403 |
| 6,461,415 B1 | 10/2002 | Sambasivan et al. |
| 6,498,119 B2 | 12/2002 | Wagh et al. |
| 6,518,212 B1* | 2/2003 | Wagh et al. ............ 501/111 |
| 6,561,269 B1 | 5/2003 | Brown et al. |
| 6,569,263 B2* | 5/2003 | Brown et al. .......... 148/253 |
| 6,723,162 B1 | 4/2004 | Cheyrezy et al. |
| 6,776,837 B2 | 8/2004 | Wagh et al. |
| 6,783,799 B1* | 8/2004 | Goodson ............... 427/140 |
| 6,790,275 B2 | 9/2004 | Macklin et al. |
| 6,910,537 B2 | 6/2005 | Brown et al. |
| 6,929,865 B2 | 8/2005 | Myrick |
| 7,001,860 B2 | 2/2006 | Wagh et al. |
| 7,083,672 B2 | 8/2006 | Wagh et al. |
| 7,160,383 B2 | 1/2007 | Wagh et al. |
| RE39,804 E | 9/2007 | Wu et al. |
| 7,294,291 B2 | 11/2007 | Wagh et al. |
| 7,312,171 B2 | 12/2007 | Wagh et al. |
| 7,402,542 B2 | 7/2008 | Wagh et al. |
| 7,438,755 B2 | 10/2008 | Wagh et al. |
| 7,699,928 B2 | 4/2010 | Paul |
| 2002/0123422 A1 | 9/2002 | Wagh et al. |
| 2002/0179190 A1 | 12/2002 | Brown et al. |
| 2003/0092554 A1 | 5/2003 | Wagh et al. |
| 2003/0150614 A1 | 8/2003 | Brown et al. |
| 2004/0206267 A1 | 10/2004 | Sambasivan et al. |
| 2005/0028705 A1 | 2/2005 | Wagh et al. |
| 2005/0160944 A1 | 7/2005 | Wagh et al. |
| 2005/0229809 A1 | 10/2005 | Lally |
| 2005/0258405 A1 | 11/2005 | Sayala |
| 2005/0274290 A1* | 12/2005 | Wagh et al. ............ 106/691 |
| 2005/0288174 A1 | 12/2005 | Wagh et al. |
| 2005/0288175 A1 | 12/2005 | Wagh et al. |
| 2006/0003886 A1 | 1/2006 | Wagh et al. |
| 2006/0048682 A1 | 3/2006 | Wagh et al. |
| 2006/0235258 A1 | 10/2006 | Wagh et al. |
| 2007/0051271 A1 | 3/2007 | Kruse et al. |
| 2007/0051278 A1 | 3/2007 | Wagh et al. |
| 2007/0235702 A1 | 10/2007 | Wagh et al. |
| 2007/0284120 A1 | 12/2007 | Rowen |
| 2008/0020145 A1* | 1/2008 | Pipko et al. ............ 427/443.1 |
| 2008/0119682 A1 | 5/2008 | Wagh et al. |
| 2008/0156225 A1 | 7/2008 | Bury |
| 2008/0286609 A1 | 11/2008 | Surace et al. |
| 2009/0020186 A1 | 1/2009 | Pipko et al. |
| 2009/0075051 A1 | 3/2009 | Fyfe |
| 2009/0197991 A1 | 8/2009 | Bury et al. |
| 2009/0246389 A1 | 10/2009 | Mosser et al. |
| 2010/0083877 A1 | 4/2010 | Selph et al. |

FOREIGN PATENT DOCUMENTS

| | | |
|---|---|---|
| EP | 0739953 | 10/1996 |
| GB | 2180231 | 3/1987 |
| JP | 07024815 | 1/1995 |
| WO | WO9402428 | 2/1994 |
| WO | WO2004015005 | 2/2004 |
| WO | WO2009118072 | 10/2009 |

OTHER PUBLICATIONS

Gorecki, George, Improved Iron Phosphate Corrosion Resistance by Modification with Metal Ions, Metal Finishing, Mar. 1995, pp. 36-39.

Laufenberg, Theodore L., et al., "Phosphate-Bonded Ceramic-Wood Composites: R&D Project Overview and Invitation to Participate", Proceedings of Ninth International Conference on Inorganic-Bonded Composite Materials, Oct. 2004.

Korean Intellectual Property Office, PCT International Search Report and Written Opinion of the International Searching Authority for International Application No. PCT/US2010/046126 dated Feb. 28, 2011.

* cited by examiner

INORGANIC PHOSPHATE CORROSION RESISTANT COATINGS

The present application claims the benefit of U.S. Provisional Application Nos. 61/285,948 filed Dec. 11, 2009 and 61/288,192 filed on Dec. 18, 2009, the entire contents of each being incorporated by reference herein.

TECHNICAL FIELD

This disclosure relates to coatings comprising acidic phosphate and alkaline metal oxide/hydroxide components that inhibit corrosion of metals, and specifically, the manufacture and method of coating on metal.

BACKGROUND

Corrosion of structural steel and other metals is a serious problem in construction and utility industry. When exposed to humid and saline environments, especially at elevated temperatures, steel deteriorates. To minimize or reduce the extent of this corrosion, alloys of steel, such as galvanized (zinc coated) compositions, or chrome plated compositions are used. While this approach may solve the problem in the short run, the problem persists when the steel is exposed to the above-mentioned environments over long periods of time. This invention discloses uniquely-suited phosphate-based composite coatings that minimize or reduce the corrosion of steel or other metals and make it unnecessary to use alloys of steel such as galvanized (zinc coated) compositions or chrome plated compositions.

Phosphating to passivate a steel surface is generally known in the steel industry. Typically, well polished steel is immersed in phosphate bath of pH between 4-4.5 containing 2-3 g/L phosphoric acid, 2-3 g/L of ammonium or zinc dihydrogen phosphate as buffer, and a small amount (<0.5 g/L) of oxidizer, to produce an iron phosphate passivation layer. In the process, however, hydrogen gas is liberated by the reaction of elemental iron with water in the extremely acidic environment. This produces a very thin passivation layer that is porous and not abrasion resistant, and as a result, an additional coating is required to make the surface of the passivated steel inaccessible to atmospheric oxygen. This process has, therefore, at least the following disadvantages: (i) an acid immersion bath/tank, which generates sludge as formed by accumulating reaction products—making the bath less effective and creating environmental disposal issues for the sludge and the acidic solution; (ii) oxidizers used in the passivation process produce toxic gases. For example, chlorates produce chlorine, meta nitro benzene sulfonic acid produces nitrous oxide, potassium permanganate presents occupational health risks; (iii) resultant passivation layers are not abrasion resistant, therefore, abrasion resistance must be augmented by additional coating(s).

SUMMARY

In a first embodiment, a method for preventing or reducing corrosion of a corrodible metal surface is provided. The method comprises contacting the corrodible metal surface with a mixture of an acidic phosphate component and a basic component comprising at least one of a metal oxide, a basic metal hydroxide, or basic mineral. In addition to corrosion resistance, improved abrasion resistance is also obtained using the compositions and methods herein disclosed.

In a first aspect of the first embodiment, the acidic phosphate component is phosphoric acid, alkali metal dihydrogen phosphate $MH_2PO_4$, alkali earth dihydrogen phosphate $M(H_2PO_4)_2$ or its hydrate, transition metal trihydrogen phosphate $MH_3(PO_4)_2$ or its hydrate, or mixtures thereof.

In a second aspect, alone or in combination with any one of the previous aspects of the first embodiment, the acidic phosphate component is mono potassium phosphate or its hydrate.

In a third aspect, alone or in combination with any one of the previous aspects of the first embodiment, the basic component is at least one of magnesium oxide, barium oxide, zinc oxide, calcium oxide, copper oxide, iron oxide, and hydroxides thereof, or magnesium brine containing an effective amount of magnesium hydroxide.

In a fourth aspect, alone or in combination with any one of the previous aspects of the first embodiment, the basic component is at least one of magnesium oxide and magnesium hydroxide.

In a fifth aspect, alone or in combination with any one of the previous aspects of the first embodiment, the acidic phosphate component is mono potassium phosphate or its hydrate, and the basic component is magnesium brine having a pH of about 9 to about 11, wherein the magnesium brine contains an effective amount of magnesium hydroxide.

In a sixth aspect, alone or in combination with any one of the previous aspects of the first embodiment, the mixture of acidic phosphate component and basic component forms at least one of magnesium potassium phosphate, magnesium sodium phosphate, magnesium hydrogen phosphate, copper hydrogen phosphate, zinc hydrogen phosphate, barium hydrogen phosphate, or iron hydrogen phosphate.

In a seventh aspect, alone or in combination with any one of the previous aspects of the first embodiment, the surface is steel or aluminum.

An eighth aspect, alone or in combination with any one of the previous aspects of the first embodiment, further comprises producing on the contacted corrodible surface a magnesium-glass-phosphate, glossy coating.

In a ninth aspect, alone or in combination with any one of the previous aspects of the first embodiment, the contacting is with a slurry, paste, spray, or vapor thereof, independently, of the acidic phosphate component or the at least one of the basic metal oxide or the basic metal hydroxide component.

In a second embodiment, a corrosion-inhibiting coating composition is provided. The coating composition comprises a slurry of a combination of one or more iron oxides with magnesium dihydrogen phosphate.

In a first aspect of the second embodiment, the iron oxide is a mixture of magnetite ($Fe_3O_4$) or wustite FeO, and hematite ($Fe_2O_3$). In another aspect, the total amount of hematite used is greater than the amount of magnetite or wustite.

In a third embodiment, a method is provided, the method comprising contacting a corrodible surface with coating consisting essentially of a mixture of magnetite or wustite, and hematite; with a solution of phosphoric acid or magnesium dihydrogen phosphate, wherein the corrodible surface is essentially without a primer layer; and providing a corrosion-inhibiting coating, the coating comprising iron hydrogen phosphate.

In a fourth embodiment, a method of providing corrosion inhibition is provided. The method comprises providing a combination of at least one of the following: (i) magnesium oxide (MgO) and mono potassium phosphate ($KH_2PO_4$); (ii) magnesium oxide (MgO) and phosphoric acid solution ($H_3PO_4$ solution); (iii) magnesium oxide (MgO) and magnesium dihydrogen phosphate; (iv) ferric oxide ($Fe_2O_3$) and phosphoric acid ($H_3PO_4$); (v) magnesium brine containing an effective amount of magnesium hydroxide and mono potassium phosphate ($KH_2PO_4$); (vi) magnesium brine containing an effective amount of magnesium hydroxide and phosphoric acid ($H_3PO_4$); or (vii) magnesium brine containing an effective amount of magnesium hydroxide and magnesium dihydrogen phosphate; and contacting the surface of a corrodible metal with at least one of the combinations (i)-(vii).

In a first aspect of the fourth embodiment, the combination is presented as a slurry, paste, spray, or vapor.

In a fifth embodiment, an article comprising a corrosion-inhibiting coating formed by the combination of an acidic phosphate with a basic metal oxide or basic metal hydroxide is provided.

In a first aspect of the fifth embodiment, the coating is at least one of magnesium potassium phosphate, magnesium sodium phosphate, magnesium hydrogen phosphate, barium hydrogen phosphate, copper hydrogen phosphate, zinc hydrogen phosphate, or iron hydrogen phosphate.

In a second aspect, alone or in combination with any one of the previous aspects of the fifth embodiment, polyphosphates are present at the interface of the article surface and the corrosion-inhibiting coating.

In a third aspect, alone or in combination with any one of the previous aspects of the fifth embodiment, magnesium chromates are present at the interface of the article surface and the corrosion-inhibiting coating.

In a sixth embodiment, a steel or iron-based article having a coating comprising a berlinite phase ($AlPO_4$) detectable by x-ray diffraction is provided.

In a seventh embodiment, a method is provided. The method comprises contacting a previously corroded surface overlaying a metal with a composition comprising a mixture of an acidic phosphate and a basic metal oxide or a basic metal hydroxide, wherein an excess of the composition and a portion of the previously corroded surface is rendered readily removable and/or dislodges from the surface.

A first aspect of the seventh embodiment, further comprises forming a thin, corrosion protection layer on the surface.

In a second aspect, alone or in combination with any one of the previous aspects of the seventh embodiment, wherein the mixture provides at least one of magnesium potassium phosphate, magnesium sodium phosphate, magnesium hydrogen phosphate or iron hydrogen phosphate to the metal surface.

In a second aspect, alone or in combination with any one of the previous aspects of the seventh embodiment, the corrosion protection layer is capable of self regenerating the corrosion protection layer from defects formed therein.

In any of the first, second, third, fourth, fifth, sixth or seventh embodiment, alone or in combination with any of their respective aspects, methods and articles of improved abrasion resistance or in combination, improved corrosion and abrasion resistance is provided.

DETAILED DESCRIPTION

The uniquely-suited formulations and methods disclosed and described herein are based on acid-base inorganic phosphate compositions. Examples of the coatings provided herein include magnesium potassium phosphate coating, and iron hydrogen phosphate coating. These compositions are used as coatings on steel and other metals as corrosion inhibitors. When applied to a metal surface as a coating, the paste formed by any of these compositions reacts with the metal, bonding therewith and forming a thin layer/coating to the surface of the metal. The bonded layer is hard and inhibits corrosion of the metal surface. A range of phosphate-based formulations may be used to coat and prevent or minimize the corrosion of metal surfaces.

Processes and articles prepared therefrom disclosed and described herein overcome many if not all of the problems related to conventional passivation processes of steel and other corrodible metals. The instant processes also provide a more economical, environmentally-friendly method of coating steel and other metal surfaces with acid-base inorganic phosphate based coatings that not only passivate the layer but also provide abrasion resistance along with good aesthetics in one step.

Figure 1:
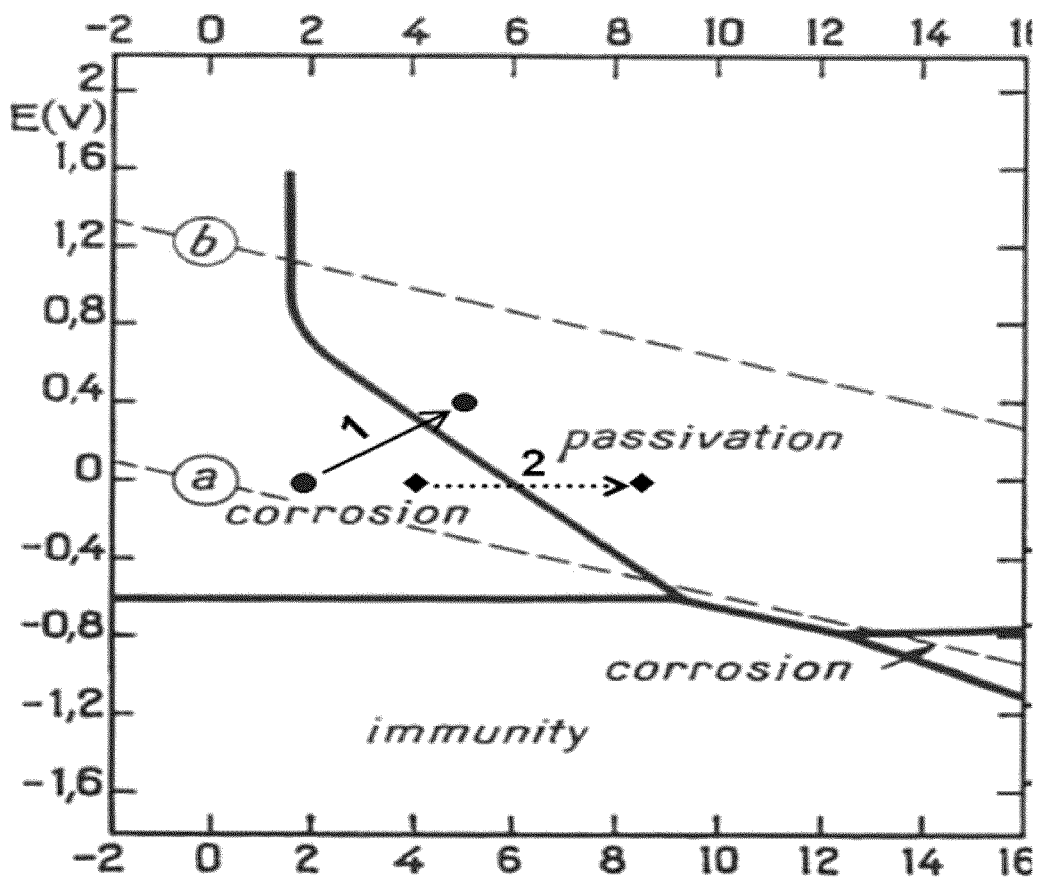
FIG. 1 is a depiction of the redox potential vs. pH diagram for iron showing passivation and corrosion regions and comparing conventional phosphate coating and the methods disclosed and described herein.

Referring now to FIG. 1, which is a representation showing stability regions of various phases of iron as a function of pH and the redox potential Eh. The black bold curves separate immunity, corrosion, and passivation regions for steel, where the lower region represents the immunity region where iron remains in metal form, the left hand side of this region is the corrosion region where iron is dissociated into $Fe^{2+}$(aq) ions, and the right hand side representing the passivation region where iron becomes iron trihydroxide $Fe(OH)_3$.

When phosphating is done according to the conventional processes of dip coating steel components in a bath of phosphoric acid (or an acid phosphate) and an oxidizer, the steel surface moves from very low pH to slightly higher pH and at the same time, due to presence of the oxidizer, it also moves to a higher Eh point (see line 1). In the process, it passes from the region of corrosion to passivation and the surface is converted from a corrosive layer to a passivating layer. This passivation layer is essentially that of iron phosphate ($FePO_4$), magnetite, and iron hydroxide ($Fe(OH)_3$). The surface is generally porous and smooth and therefore needs a coating to plug in the porosity in order to protect the passivated surface completely from atmospheric corrosion. This also represents the process in which an oxidant, such as potassium permanganate, is used. Conventional polymeric coatings can be characterized as moving the steel surface from the corrosion region to passivation region by oxidizing the steel surface to $Fe(OH)_3$. However, the passivation layer formed from this process is fairly close to the region of corrosion for steel and thus, explains at least in part, some of the inferior characteristics of this method.

In contrast, the process disclosed and described herein is based on an inorganic phosphate coating produced by acid-base reaction of an acidic phosphate and a metal oxide or metal hydroxide, or oxide mineral. Since the instant process is essentially based on an acid-base reaction, the end reaction product is near neutral, and the pH of coatings prepared therefrom are believed to be between 8 and 9, which is further positioned in the passivation region as shown in FIG. 1. In certain aspects, there is present an excess of alkaline precursor (e.g., magnesium hydroxide) distribution in the coating that has not reacted, which is believed beneficial in raising the pH of the coating beyond 7 to further position the coating in the passivation region as represented in FIG. 1.

Due to sufficiently high pH of the instant coating formulations, steel surfaces will likely remain in the pH range of passivation region (well above pH=6). Thus, the instant coatings can protect against intrusion of acidic solutions, at least in part due to the excess $Mg(OH)_2$ present, which can function as a buffer to protect steel from corrosion. The instant coatings are superior to current commercial coatings containing zinc hydroxides with regard to buffering capacity, because zinc hydroxide is not stable below pH of 5. Thus, zinc oxide coatings can place steel substrate in the corrosion region in acidic environments. Moreover, based on lower electrode potential of magnesium ($Eo^{Mg+2}=-2.37V$) verses zinc ($Eo^{Zn+2}=-0.7V$), either in low pH environments or reduction environments, magnesium-based coatings, as disclosed herein, will provide better protection than zinc-based coatings. Protection of steel in the reduction environment using the instant coatings is beneficial for applications requiring high temperatures, such as waste to energy incinerators, turbines, in any hydro carbon combustion environment, and in some chemical processes.

The instant coatings disclosed herein can comprise, in part, the formation of poly phosphates, and in particular, poly phosphates formed by phosphites at the interfacial regions of the substrate surface in the instant coating. Polyphosphate can provide abrasion resistance and impermeability to water and humidity, thus improving abrasion resistance as well as improving corrosion resistance to the substrate surface.

In one aspect, an acid-phosphate composition, one acidic with a pH between about 3 to about 4.5, and the other, an alkaline component with a pH between about 10 and about 11. These two components are contacted with the substrate surface, where they combine form a coating. For example, mono potassium phosphate ($KH_2PO_4$) and a magnesium hydroxide ($Mg(OH)_2$, or its brine) composition with or without fillers such as wollastonite ($CaSiO_3$) or fly ash, can be combined and contacted with a corrodible metal surface (e.g., steel). Once the compositions contact the surface, a coating forms that bonds instantly to the substrate. While not wishing to be held to any particular theory, it is believed that the contact by the acidic phosphate and an alkaline oxide or hydroxide, or oxide mineral components provides an initial passivation layer (sub-, primer, or bottom layer) as well as the corrosion protective layer.

Line 2 in FIG. 1 shows at least in part, a typical result of the process disclosed and described herein. In a first step of the instant process, when the mixture of the acid and base is sprayed on the substrate, the acid solution lowers the pH of the substrate. At this point, most if not all of the chemical reactions that occur in the commercial dip coating also occur in the instant process as the first step. However, in the subsequent acid-base reaction, reaction products such as magnetite, or iron hydroxides, react with the phosphate and form iron phosphate. The acid base chemistry of the instant process increases the pH to approximately 8, and in turn, drives the steel substrate pH beyond the corrosion region to the passivation region. In addition, the instant process also produces a phosphate-based abrasion resistant coating, thus resistant to both corrosion and abrasion. Therefore, the instant method eliminates the need for baths of acid solution, sludge to be disposed, the regimental time frame for dipping and drying, and after-coating of the steel.

First Component—Acid Phosphate Precursor Material

Acidic Phosphate Component

The acidic phosphate component consists of phosphoric acid and/or an acid-phosphate of formula, $A^m(H_2PO_4)_m \cdot nH_2O$, where A is an m-valent element such as sodium (Na, m=1), potassium (K, m=1), magnesium (Mg, m=2), calcium (Ca, m=2), aluminum (Al, m=3) etc. A may also be a reduced oxide phase when higher-valent oxides are used. For example, for iron, which exists in valence state of +2 and +3 (FeO and $Fe_2O_3$ as oxides), A can be the metal of lower oxidation state. It can also be a cation of oxides of four-valent metal oxide such as $ZrO^{2+}$, in which case $m=2 \cdot nH_2O$ in the formula above is simply the bound water, where n can be any number, normally ranging from 0 to 25.

It is possible to use hydro phosphates of trivalent metals such as aluminum, iron and manganese represented by the formula $AH_3(PO_4)_2 \cdot nH_2O$, where A is a transition metal that includes aluminum, iron, manganese, yttrium, scandium, and all lanthanides such as lanthanum, cerium, etc.

In case the pH of the acidic precursor is higher than needed for instant reaction, phosphoric acid may be added and the pH may be adjusted to bring down the pH. A preferred pH selected is between 3 and 4, and the most preferred pH is between 3 and 3.5. either elevating the pH of phosphoric acid or that of an acid-phosphate such as magnesium dihydrogen phosphate ($Mg(H_2PO_4)_2$) or aluminum trihydrogen phosphate ($AlH_3(PO_4)_2$) by neutralizing partially using an alkaline oxide, hydroxide, or a mineral, or by acidifying a dihydrogen phosphate such as mono potassium phosphate ($KH_2PO_4$) that has a pH>3.5 by adding a small but appropriate amount of phosphoric acid or a low pH acid phosphate such as $Mg(H_2PO_4)_2$ or aluminum trihydrogen phosphate $AlH_3(PO_4)_2$. Examples described later in this document provide the art of adjusting this pH.

Often the acid-phosphate used in the precursor is only partially soluble. In such a case, the precursor is wet-milled so that the average particle size passes through 230 mesh sieve (less than 70 micron).

For oxychloride and oxysulfate compositions, the acidic component consists of magnesium oxychloride, and magnesium oxysulfates appropriately acidified with either hydrochloric acid or sulfuric acid to reduce the pH.

Water may be added to the precursor component to reduce the viscosity thereof, or other types of viscosity reducing agents may be used. Commercial additives that prevent algae growth may also added to this precursor so that no algae growth occurs during storage of this precursor.

Second Component—Basic Component

Basic Oxides, Hydroxides and Basic Minerals

Basic precursor generally consists of a sparsely soluble oxide, or preferably a hydroxide with a particle size less than 230 micron. The oxide may be represented by the formula $B^{2m}O_m$ or $B(OH)_{2m}$, where B is a 2m-valent metal. All divalent metal oxides (m=1), and some trivalent metal oxides in reduced state fall into this category of sparsely soluble oxides. Examples of divalent oxides are, but not limited to, magnesium oxide, barium oxide, zinc oxide, calcium oxide and copper oxide. Examples of trivalent oxides in reduced state are iron oxide (FeO), and manganese oxide (MnO).

Inorganic Phosphate Coating Compositions

A range of phosphate compositions may be used as the corrosion inhibitor coatings commensurate with the spirit and scope of that disclosed and described herein, the following four exemplary, non-limiting examples are provided:
1. Magnesium potassium phosphate coating formed by the combination and/or reaction of magnesium oxide (MgO) and mono potassium phosphate (KH2PO4), which in the presence of water combine to produce magnesium potassium phosphate cement, comprising MgKPO4.6H2O. Magnesium potassium phosphate is also referred to hereafter as "MKP".
2. Magnesium hydrogen phosphate (newberyite) coating formed by the combination and/or reaction of magnesium oxide (MgO) and phosphoric acid solution (H3PO4 solution), which when mixed well and allowed to dry, combine to produce a magnesium hydrogen phosphate coating comprising MgHPO4.3H2O.
3. Magnesium hydrogen phosphate (newberyite) coating formed by the combination and/or reaction of Magnesium dihydrogen phosphate compositions usually have an aqueous pH between about 2.5 and about 5.0. MHP solutions with a pH of about 3 or slightly higher are generally believed more effective in the production of corrosion resistant products and, for at least that reason, tend to be preferred. Magnesium hydrogen phosphate is also referred to hereafter as "MHP".
4. Iron hydrogen phosphate coating formed by the combination and/or reaction of wustite (FeO) or magnetite (Fe3O4) and phosphoric acid (H3PO4), which when mixed well and allowed to dry combine to produce iron hydrogen phosphate coatings comprising FeHPO4. Iron hydrogen phosphate is also referred to hereafter as "mono-iron phosphate", or "MIP".

Under ambient conditions, magnesium potassium phosphate compositions, magnesium hydrogen phosphate compositions and iron hydrogen phosphate compositions exhibit a paste-like consistency. When these compositions are applied to a surface, e.g., steel, as coatings, it is believed that a reaction occurs and a thin layer of the above compositions bonds to the metallic surface. The remaining parts of the coatings are loosely bound and can be easily scraped off, but the thin layer coating is very hard, resistant to abrasion, and inhibits corrosion of the surface. Thus, this thin layer acts like a primer, protecting the metallic surface from corrosion. Similar results are observed when these compositions are applied to the surface of other metals besides steel, such as aluminum.

Detailed X-ray diffraction studies (see, for example, FIG. 2) of magnesium-containing coatings of the instant disclosure appear to comprise a thin layer of magnesium chromate, which is believed formed as a result of the reaction of chromium from the metal surface and magnesium oxide/hydroxide from the instant magnesium-containing coating. The reaction may be represented by

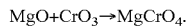
MgO+CrO3→MgCrO4.

Since the excess overlayer of acidic phosphate/alkaline oxide is somewhat deficient in alkaline oxide content, it does not set at this interface and can be easily removed, leaving a thin primer on the surface, which is well bonded.

It is also possible to independently produce this primer by diluting the acidic phosphate/alkaline oxide, material and then applying the diluted coating on the surface. In the case of steel treatment, the thin layer is mostly transparent and it retains the shiny surface and texture of the treated steel. Coatings of MKP, MHP or MIP In another aspect, disclosed and described herein, is a method of contacting a rusted (corroded) surface of steel with a composition comprising an acidic phosphate and alkaline metal oxide/hydroxide, where an excess of the composition and a portion of the rust is rendered readily removable and/or dislodges from the surface, and a thin and hard corrosion protection layer is provided on the steel surface. Thus, the instant coatings disclosed and described herein make it is possible to "clean" a surface of rusted steel and apply a corrosion protection layer at the essentially same time.

As discussed above, during the coating of the steel using the instant process, it is believed that a primer is formed by the reaction of chromium from the steel surface and the oxide from the coating. Therefore, in one aspect, an oxide-rich coating, whereby some of the oxide is used in forming a primer and the rest is used in the reaction that forms a acid-base phosphate coating, protective (corrosion/abrasion-resistant) coating, is provided. Thus, application of a "primer and paint" can be accomplished in just one step (or one coat), where the primer and/or paint provides corrosion resistance for corrodible surfaces.

In another aspect, the instant corrosion resistant coatings can be formulated to provide aesthetic properties, such as proper shine and texture on them. This effect may be achieved, for example, by adding crushed glass or any other high solubility glass to the instant acidic phosphate/alkaline metal oxide/hydroxide formulations. The resulting coating comprising crushed glass prepared by the processes disclosed herein is a very dense glassy surface. Additional suitable ceramic pigments may be further added to produce colored paints. Soluble glass in combination with the instant compositions above can also be used in formulations for coating of solid objects, to provide very dense, glassy solid coatings having corrosion resistance.

EXPERIMENTAL SECTION

The following examples are illustrative of the embodiments presently disclosed, and are not to be interpreted as limiting or restrictive. All numbers expressing quantities of ingredients, reaction conditions, and so forth used herein may be understood as being modified in all instances by the term "about." Accordingly, unless indicated to the contrary, the numerical parameters set forth herein may be approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches. Several experimental examples, listed below, were conducted in order to formulate, coat, and demonstrate the attributes of the instant compositions disclosed herein.

Example 1

MHP-Based Corrosion Protection Layer

Figure 2:
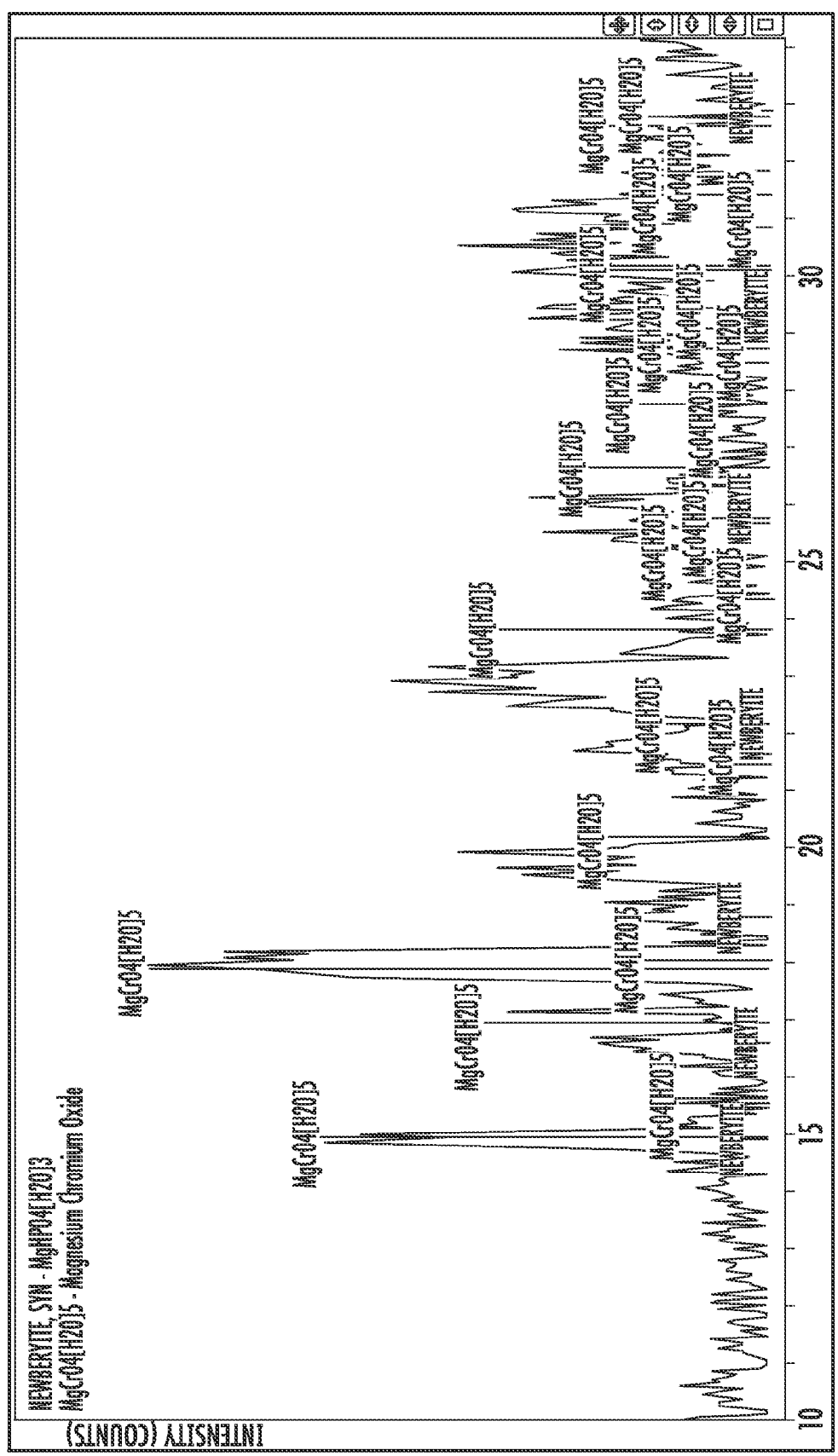
FIG. 2 is an X-ray diffraction pattern diagram illustrating a corrosion protection layer of a coating composition as disclosed and described herein.

In this Example, MHP (Mg(H2PO4)2 2H2O) was first diluted with water, and calcium silicate and aluminum oxide were added as fillers to form a thin paste. The amount of water used in diluting the MHP-based material can vary, depending on the amount of water contained in the material to begin with (most MHP-based materials are difficult to dry when made and, therefore, usually contain some water.) Preferably, dilution water should be added in an amount equivalent to about 20% by weight of MHP. The amounts of calcium silicate and aluminum oxide added as fillers to form a thin paste may also vary. In this example, 80 grams of calcium silicate and 60 grams of aluminum oxide were added for each 100 grams of MHP. To this mixture, 96 grams of MgO were added for each 100 grams of MHP. The calcium silicate and the aluminum oxide were mixed for 10 minutes each. When the MgO was added the temperature of the paste was monitored, and mixed until it reached a temperature of about 85° F. The paste was then applied to a well polished steel plate surface and the plate was cured for several days at ambient. After one week, the top (excess) dried layer of the coat could be easily removed, but a thin layer coating was present on the steel surface, which adhered to the surface extremely well. Some of the paste had run down to the other side of the plate and had bonded to the edges of the plate. It was observed that the uncoated side of the plate had corroded in the center, away from the bonded part along the edges, but a contour of non-corroded region remained between the bonded part and the center. It was surmised that the paste segregated on the other side and a thin paste seeped beyond the visible part of the coat on the other side. FIG. 2 shows the X-ray diffraction pattern of this layer on steel, where distinct peaks of magnesium chromate are observed. As discussed above, it is believed that chromium from the steel reacts with magnesium oxide in the acid environment, providing a chemically very stable magnesium chromate product, which may contribute in part to the corrosion protection afforded by the coating.

Example 2

Corrosion Protection Layer on Rusted Steel Surface

Figure 3:
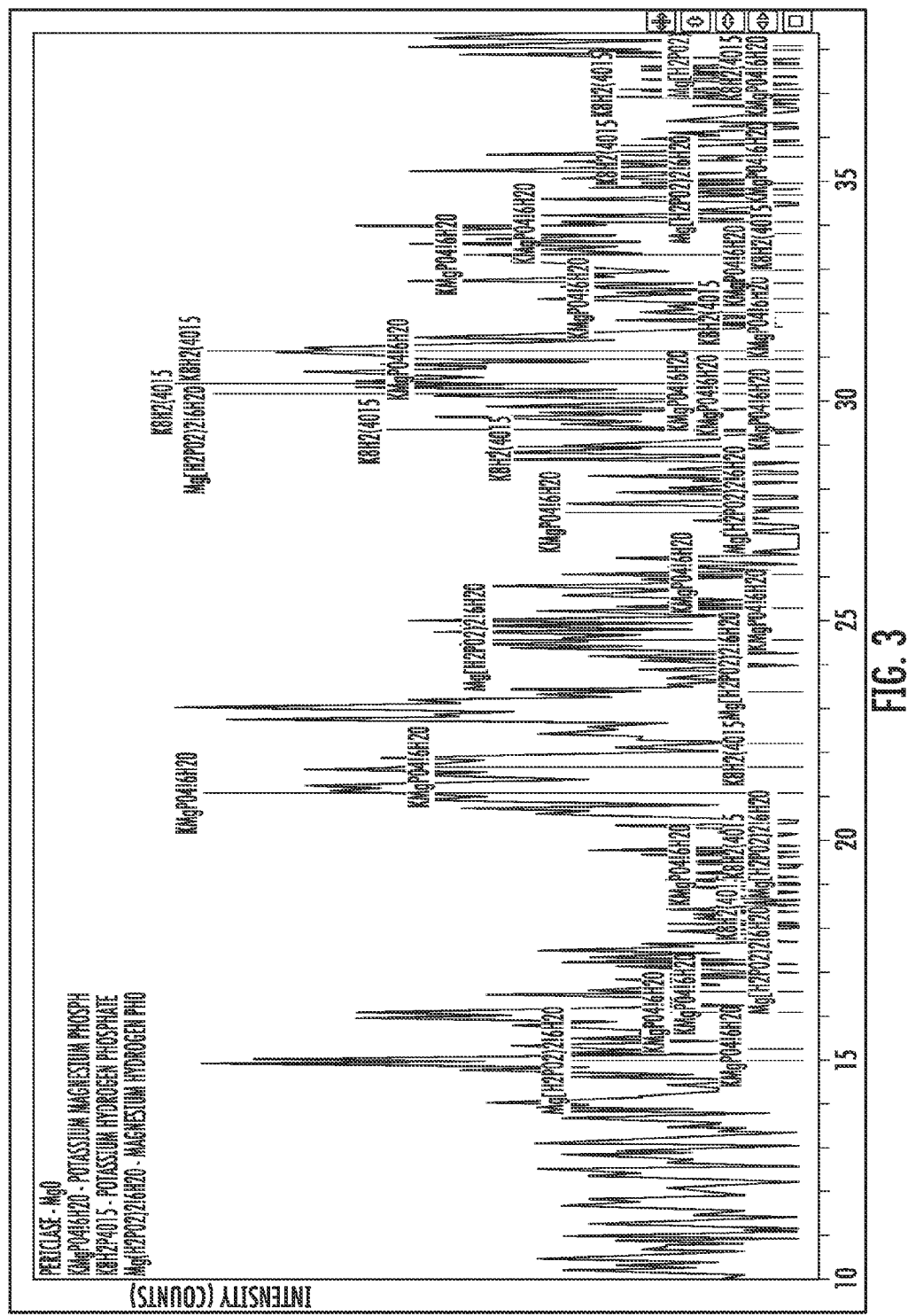
FIG. 3 is an X-ray diffraction pattern diagram illustrating a coating composition as disclosed and described herein.

In this Example, an MKP-based formulation prepared as a paste comprising calcium silicate was applied on a rusted surface of steel. The MKP paste was formed by mixing one part of dead-burnt magnesium oxide (calcined at temperatures higher than about 1,300° C.), three parts of mono potassium phosphate and six parts of calcium silicate. To this powder mixture was added two parts of water to provide a paste. As mixing was continued, the paste cooled by a couple of degrees initially, indicating dissolution of mono potassium phosphate; but, as magnesium oxide began to react, the temperature began to rise. Mixing was continued until the temperature of the paste rose to about 85° F. and, at this point, the paste was applied to the rusted surface of the steel. When cured, the top (excess) part of the coat could be removed easily. This hardened layer, however, also removed the corrosion (rust) layer from the plate. Surprisingly, a part of the paste had seeped through the rust and had bonded to the underlying steel surface. FIG. 3 shows various phosphate phases contained in this corrosion preventing layer. Noteworthy is that the steel surface did not corrode when kept in humid and hot atmosphere, indicating the acid-base phosphate formation provided a corrosion protection layer.

Example 3

Iron Oxide Based Corrosion Protection Paint

In this example, 165 grams of MHP material were dissolved in 168 grams of water by mixing and stirring for about one hour. To the resulting solution was added 16.5 grams of wollastonite ($CaSiO_3$) passing 200 mesh. The resulting paste was stirred and mixed for about 35 minutes, after which 200 grams of hematite ($Fe_2O_3$) was added and the paste further stirred and mixed for about 15 minutes. 5 grams of magnetite ($Fe_3O_4$) was then added and the paste further stirred and mixed for about 10 minutes. The resulting paste was then painted onto the surface of a polished mild steel plate. Setting was very slow. There was no detectable heating during curing, however, once set, the coating adhered to the steel surface and could not be removed easily. The coating provided excellent corrosion resistance to the steel. On this surface a second layer of phosphate cement, as described in Example 4 below, can optionally be added.

Example 4

Figure 4:
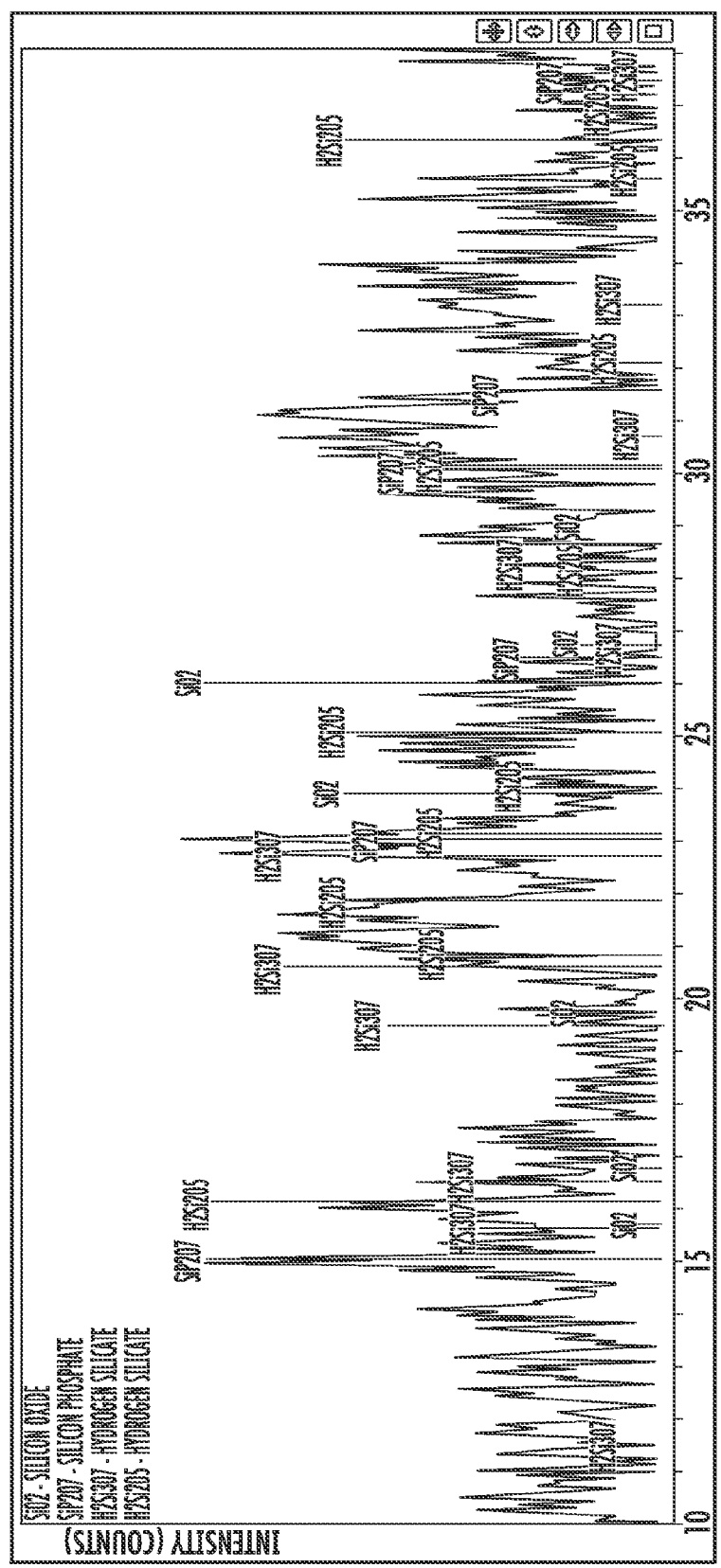
FIG. 4 is an X-ray diffraction pattern diagram illustrating a coating composition as disclosed and described herein.

Magnesium-Glass Phosphate Composite Formulation 300 grams of mono potassium phosphate, 100 grams of crushed window glass of sand consistency (average particle size of 70 micrometer) and 200 grams of water were mixed for about 90 minutes. To this mixture, 100 grams of dead-burnt magnesium oxide were added. The paste was mixed for about 20 minutes, which thickened. The thickened paste was then brushed on the coating described in Example 3, and the remaining paste was poured in a plastic tray. Both samples had hardened by the next day. The coating was well bonded to the primer of the Example 3 and formed an attractive, aesthetically pleasing, shiny (or glossy) coating. The paste poured in the tray was also a very hard ceramic-like material. This ceramic sample was cured for an additional one week and X-ray diffraction studies were performed. FIG. 4 shows a section of the X-ray diffraction pattern clearly indicating that $MgKPO_4.6H_2O$ was formed, as well as several phases of hydrated silico-phosphate minerals. These include, $H_2Si_2O_5$, $H_2SiO_3O_7$, and unhydrated phases $SiP_2O_7$ and $SiO_2$. This composition is unique and can be used in one or more applications, for example, as an electrical insulator, a glossy paint, and/or a corrosion resistant paint.

Example 5

Use of MHP as Corrosion Protective Layer

In this example, a solution of magnesium dihydrogen phosphate material (MHP) was used. MgO was added slowly to water with continuous mixing, so that all of it became wet. About 20% of the stoichiometric amount of MgO was withheld from the formulation and the composition was prepared as a thin paste. This paste was dried at 50° C. and then heated. The result was a set MHP material ($Mg(H_2PO_4)_2 2H_2O$ "s-MHP") manufactured with a sub-stoichiometric amount of MgO and some heat treatment. The s-MHP material was applied over well polished mild steel and the coated steel plate was placed in sunlight in humid conditions. The surface of the steel contacted with the s-MHP material layer remained uncorroded, while surfaces not covered corroded heavily. The s-MHP material had well set on the surface and could not be dislodged easily.

In another test, steel plates were coated with the paste formed by the s-MHP material with additional MgO (stoichiometric excess). The coating was hard and dense. X-ray diffraction studies on solid samples made by this composition showed that the coating contained newberyite ($MgHPO_4.3H_2O$) and some unreacted magnesium oxide. Some of the paste seeped to the bottom of the plate along the edges. The plate was put in sunlight in a humid environment. The bottom side of the plate corroded at the center, but there was a contour gap between the central corroded part and seeped layer as if the corroded part retreated from the applied region. It is perhaps likely that wet material seeped beyond the set layer and that protected the contoured part from corrosion. Thus, the s-MHP material with added MgO provided a hard, abrasion resistant and corrosion resistant coating to the steel.

Example 6

Methods of Forming Berlinite Coatings on Steel

Theoretical analysis based on thermodynamic principles indicate that aluminum trihydrogen phosphate, if reacted with aluminum oxide (corundum, $Al_2O_3$), would produce aluminum phosphate ($AlPO_4$) (berlinite) at about 150° C. Berlinite mineral phase, which is stable up to 1,500° C., would provide a high-temperature coating, and also provide for corrosion and abrasion resistance for steel and other iron-based structural components. Thus, 100 grams of aluminum trihydrogen phosphate ($AlH_3(PO_4)_2.5H_2O$) viscous paste as disclosed in Example 2, was mixed with 50 grams of aluminum oxide fine powder and mixed thoroughly to form a thick paste. In preferred aspects, the pH of the paste can adjusted to between 3-4 to reduce or prevent formation of a scale layer of ferric oxides that may reduce the coating effectiveness. This paste was brushed on mild steel substrate pre-heated at 175° C. Initially, some water fraction from the paste evaporated, but the subsequent coating bonded well to the steel. The entire assembly was maintained at 175° C. for about three hours. Once all degassing and evaporation had occurred, a second coat was applied and cured for about three hours at 175° C. The resulting thick coating formed on the steel surface was hard, dense and extremely well bonded to the steel. X-ray diffraction studies of the formed coating indicated that the coating was essentially berlinite. Thus, the methods disclosed and described herein provides for a relatively simple means for preparing berlinite-precursor formulations and thereafter forming berlinite coatings useful for providing high-temperature protection or improving high temperature service of articles, such as steel and other iron-based building materials.

Example 7

Wollastonite and water were mixed with the brine to form one stream. Mono potassium phosphate was mixed with water to form the second stream. Both were loaded in two cartridges of a plural spray gun and the mixed stream was sprayed on sandblasted standard steel panels. The measured density of this coating was 1.4 g/cm3. The measured abrasion resistance of this sample was 500 cycles/mil, >4 times that of organic commercial coatings. The measured bond strength of the coating was 300 psi, >three times that of an organic commercial coating.

Example 8

Aluminum hydrophosphate was produced by dissolving aluminum hydroxide in 50% dilute phosphoric acid solution. Aluminum oxide in three times excess to that of the acid solution was then added to this stream and resulting paste was sprayed on standard steel panels. The dried panel was heated slowly to get rid of all water. It was then heated to 350 F. The dried coating bonded to steel but with lot of cracks. A second coat of the same was sprayed on the first coat, again dried and then heated again. The second coat bonded to the first coat, did not crack and the resulting coat was dense and smooth. The measured abrasion resistance: 1000 cycles/mil, >8 times that of organic commercial coatings.

Example 9

To prove the concept of the material sustaining very high temperature, calcined magnesium oxide and mono potassium phosphate were mixed as powders in equimolar ratio and were then mixed in water. The resulting paste set into hard ceramic. It was then heated to 3000 F for three hours. It shrunk 10 vol. %, but was a dense and hard ceramic. The measured density of this sample was 2.1 g/cm$^3$

Energy Dispersive X-Ray Analysis of Coating

Figure 5:
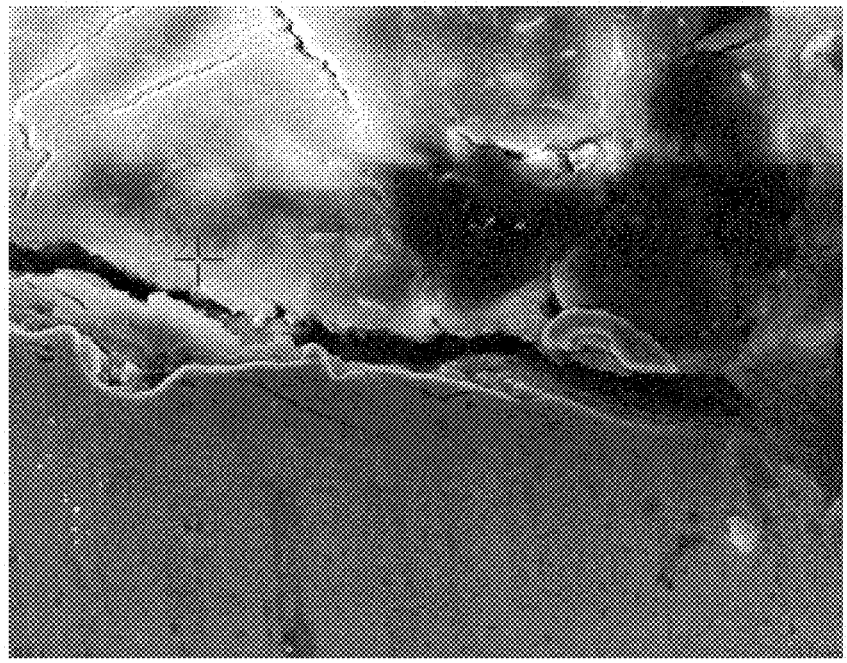
FIG. 5 is SEM image illustrating a coating composition as disclosed and described herein.
Figure 6:
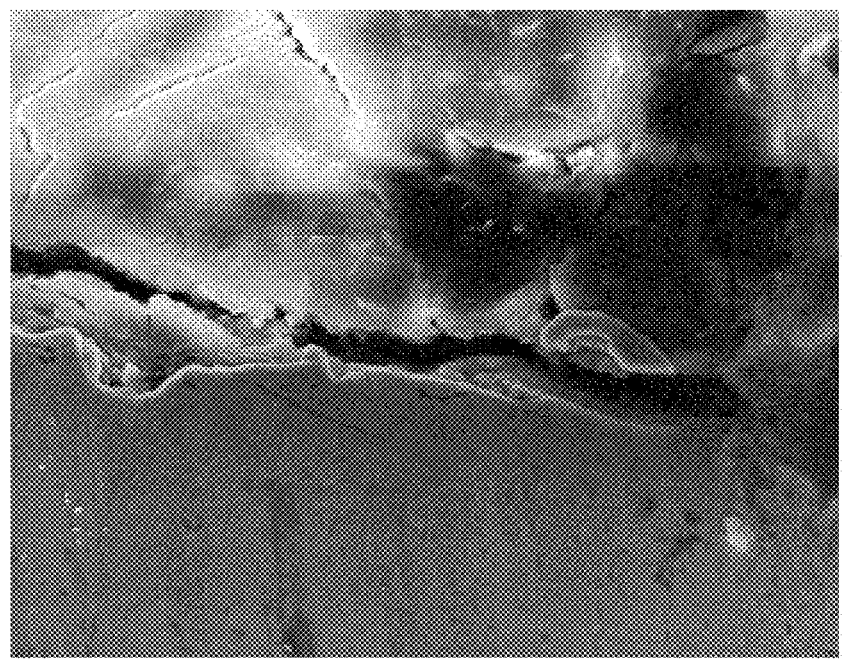
FIG. 6 is SEM image illustrating a coating composition as disclosed and described herein.

In this test, a mixture of mono potassium phosphate and water (in the ratio 2:1 by weight) in one part of a plural spray gun, and magnesia brine with 61 wt. % magnesium hydroxide and 39 wt. % water in the second part of the gun was sprayed on sandblasted steel panels as one stream. The paste formed by the mixture of the two components set as a coating on the steel surface. The plate was cut vertically to expose the cross section of the coating. Photographs in FIGS. 5 and 6 show the layers far from the substrate and near the substrate respectively. In these photographs, the crosses indicate the points of analyses. Tables 1 and 2 summarizes the analysis of FIGS. 5 and 6 respectively, of positions remote and near from the coating-surface interface, respectively, e.g., elements detected, the wt % and atom % of the coating. The composition of this coating immediate to the substrate is observed to be richer in iron indicating it is a compound of iron and phosphorous. Potassium and calcium contents are observed to be lower in this layer, and magnesium and silicon layers are higher, which indicates the presence of magnesium silicate

TABLE 1

Corresponding to FIG. 5.

| Element | Wt % | At % |
|---------|------|------|
| O | 33.72 | 50.28 |
| Mg | 14.72 | 14.45 |
| Si | 04.78 | 04.06 |
| P | 19.13 | 14.73 |
| K | 19.47 | 11.88 |
| Ca | 06.59 | 03.92 |
| Fe | 01.58 | 00.67 |

TABLE 2

Corresponding to FIG. 6.

| Element | Wt % | At % |
|---------|------|------|
| O | 40.83 | 55.71 |
| Mg | 23.54 | 21.13 |
| Si | 21.90 | 17.02 |
| P | 01.26 | 00.89 |
| K | 02.02 | 01.13 |
| Ca | 00.23 | 00.12 |
| Fe | 10.23 | 04.00 |

Figure 7:
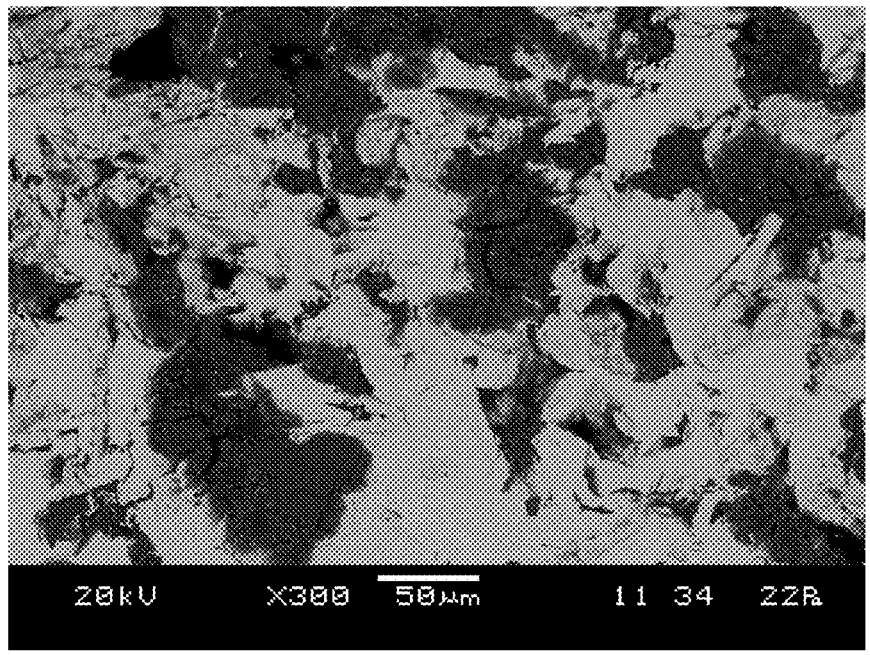
FIG. 7 is SEM image illustrating a coating composition as disclosed and described herein.
Figure 8:
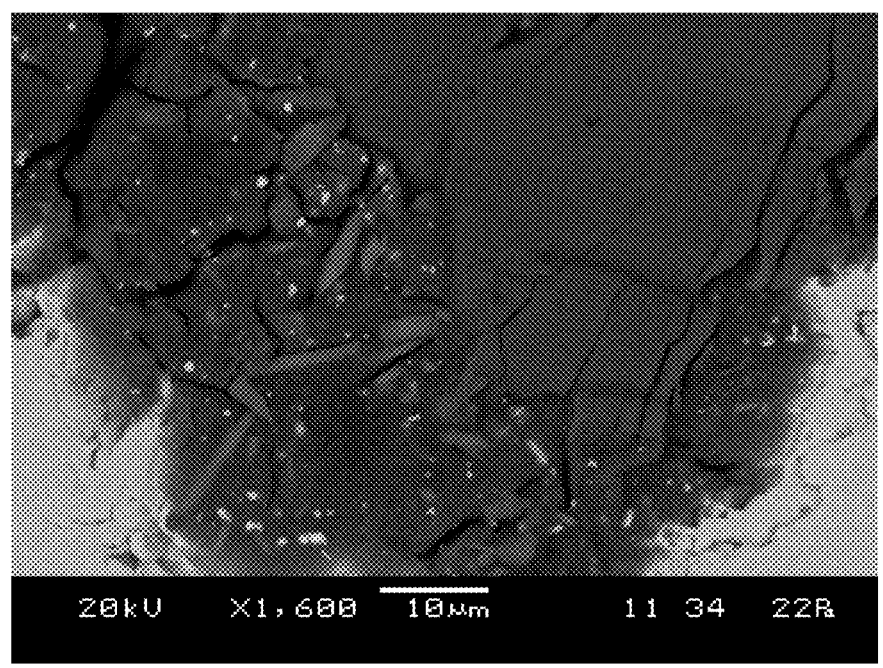
FIG. 8 is SEM image illustrating a coating composition as disclosed and described herein.

Referring to FIGS. 7 and 8, and Table 3, SEM/EDX data of the same coated sample as above was tilted and polished to expose different thicknesses of the coating and the steel at the other end. The images show the coating is comprised of many layers underneath a surface layer. Analysis of the top layer is given in the last column of Table 3 for comparison. Near equal molar content of Mg, K, and P in the top layer indicates that top it consists mainly of MgKPO4.6H$_2$O. However, distribution of Mg and K are not the same at different depths. Higher amount of Mg in these layers indicates existence of Mg (OH)$_2$. Similarly, content of Ca, and Si also vary indicating non uniform distribution of CaSiO$_3$. Rodlike structures in the right hand side micrographs show existence of wollastonite.

TABLE 3

Corresponding to FIGS. 7 & 8.

| Element | Surface layer | | | | | | | | Average | Top layer |
|---|---|---|---|---|---|---|---|---|---|---|
| O | 52.39 | 51.15 | 57.1 | 46.22 | 46.4 | 47.91 | 47.48 | 52.87 | 50.19 | 55.16 |
| Mg | 17.07 | 16.56 | 21.98 | 30.38 | 27.79 | 29.12 | 14.75 | 30.56 | 23.53 | 14.96 |
| Si | 2.09 | 2.15 | 0.88 | 14.7 | 14.14 | 14.29 | 11.4 | 1.32 | 7.62 | 0.61 |
| P | 12.19 | 12.16 | 9.2 | 0.55 | 2.22 | 0.58 | 7.94 | 5.09 | 6.24 | 15.55 |
| K | 8.7 | 7.92 | 4.58 | 0.34 | 1.08 | 0.7 | 4.84 | 3.43 | 3.95 | 12.67 |
| Ca | 1.1 | 1.59 | 0.6 | 0.16 | 0.23 | 0.32 | 6.25 | 0.61 | 1.36 | 0.53 |
| Fe | 6.47 | 8.47 | 5.65 | 7.64 | 8.15 | 7.08 | 7.34 | 6.12 | 7.12 | 0.53 |

Vapor Deposition of Corrosion Resistant Coatings

One or both of the acid phosphate or basic components can be vapor deposited, for example from an aqueous solution. This vapor deposition method can provide coats at nano- or micrometer thicknesses. Thus, each component is heated separately to produce vapors. These vapors are then funneled into a common tube, so that the vapors are mixed and then are deposited on the substrate. This coating should form that after reaction on the substrate will mimic the prime coat.

Advantage of vapor deposition methods are, a) thin passivating coats, b) minimum use of material, c) uniformity of coats, d) assembly line coating, e) automation of the process.

Self Regenerating Coating Process

Figure 9:
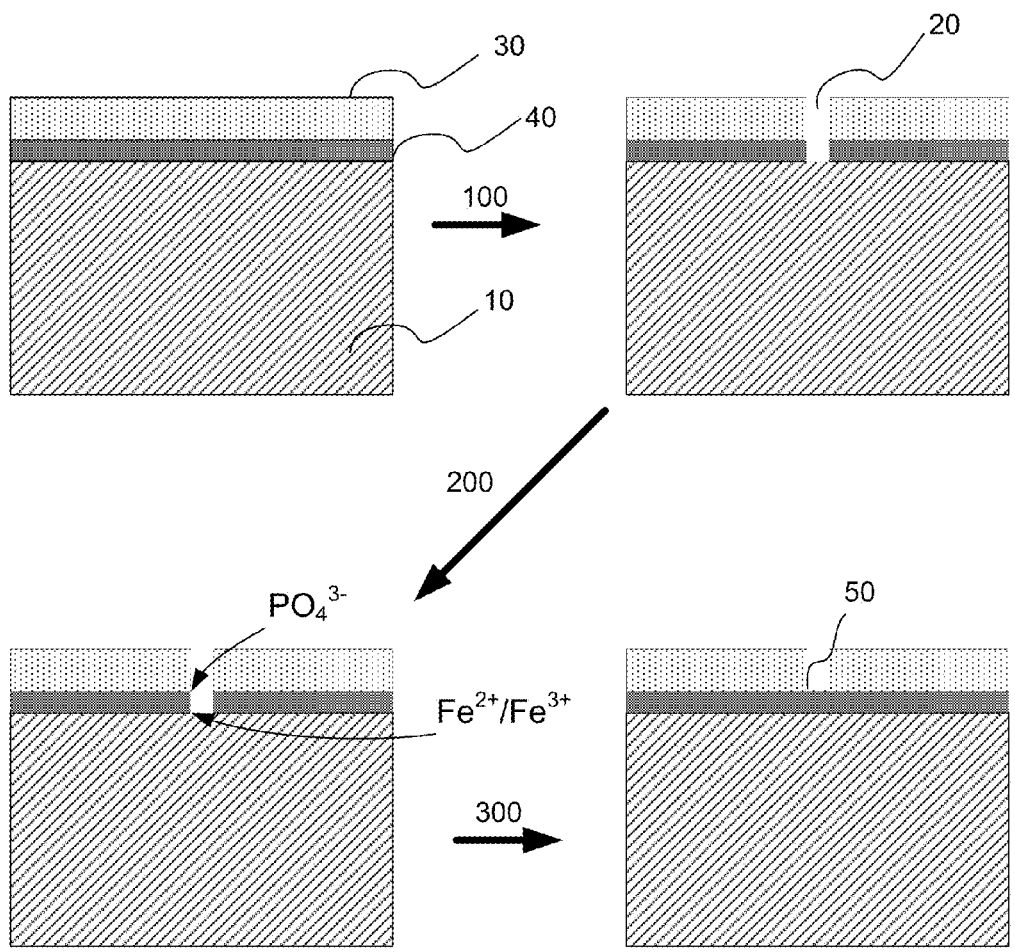
FIG. 9 is diagram illustrating a self-regenerating coating as disclosed and described herein.
Figure 10:
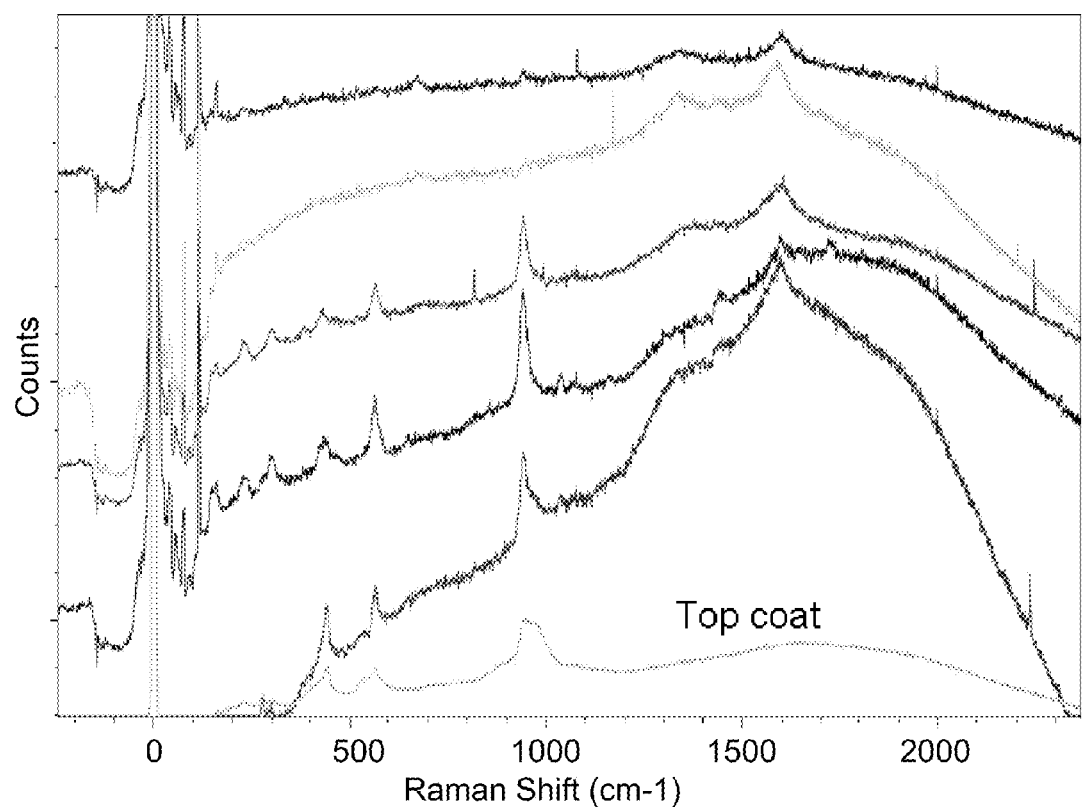
FIG. 10 is a Raman spectrograph of a coating as disclosed and described herein.

Referring to FIG. 9, a schematic of self-regeneration of the corrosion inhibiting layer is shown on a surface (10) of iron. With higher solubility of phosphate ions from $MgKPO_4.6H_2O$ compared to that from iron phosphate, any defects (20) developed in the iron phosphate primer coating (40) (as indicated by step 100) can be healed by tocoat (30) of $MgKPO_4.6H_2O$ as phosphate ions and iron migrate to the defect (as indicated by step 200) and reform (50) the iron phosphate primer coating (40) (as indicated by step 300). Thus, this $MgKPO_4.6H_2O$ top coat essentially heals defects in the thin prime coat on the substrate after a predetermined time.

Raman Spectra of Coatings

Referring to FIG. 11, All spectra are of coatings next to the substrate except the lowest one, which is on a top coat. The peak near 1000 cm-1 represents $MgKPO_4.6H_2O$. The peaks at 1618 cm-1 are identified as polyphosphates formed by Fe—P=O linkages. These polyphosphates may have chemical bond between the actual coating and the substrate.

What is claimed:

1. A method comprising
    contacting a metal surface, at least a portion of the metal surface being corroded, with a composition comprising a mixture of an acidic phosphate component and a basic component of at least one of metal oxide, metal hydroxide, or basic mineral;
    bonding at least a portion of the composition to the corroded metal surface and the metal surface; wherein at least a portion of the composition and a portion of the previously corroded surface is removable and/or dislodges from the metal surface
    removing at least a portion of both the corroded metal surface and the composition; and
    forming a thin, corrosion protection layer on the surface.

2. The method of claim 1, wherein the mixture provides at least one of magnesium potassium phosphate, magnesium sodium phosphate, or magnesium hydrogen phosphate to the metal surface.

3. The method of claim 1, wherein the corrosion protection layer self regenerates the corrosion protection layer of defects formed therein.

* * * * *